United States Patent
Estall et al.

(10) Patent No.: US 10,692,034 B2
(45) Date of Patent: Jun. 23, 2020

(54) METHODS AND SYSTEMS FOR USE IN MONITORING THE OPERATIONS OF A BUSINESS

(71) Applicant: 9 SPOKES KNOWLEDGE LIMITED, Johnsonville, Wellington (NZ)

(72) Inventors: Mark Estall, Auckland (NZ); Adrian Grant, Auckland (NZ)

(73) Assignee: 9 SPOKES KNOWLEDGE LIMITED, Wellington (NZ)

( * ) Notice: Subject to any disclaimer, the term of this patent is extended or adjusted under 35 U.S.C. 154(b) by 204 days.

(21) Appl. No.: 15/571,072

(22) PCT Filed: Mar. 18, 2016

(86) PCT No.: PCT/AU2016/050196
§ 371 (c)(1),
(2) Date: Nov. 1, 2017

(87) PCT Pub. No.: WO2016/176719
PCT Pub. Date: Nov. 10, 2016

(65) Prior Publication Data
US 2018/0349826 A1     Dec. 6, 2018

(30) Foreign Application Priority Data
May 6, 2015   (AU) ................................ 2015901618

(51) Int. Cl.
*G06Q 10/06* (2012.01)

(52) U.S. Cl.
CPC ....... *G06Q 10/06393* (2013.01); *G06Q 10/06* (2013.01); *G06Q 10/063* (2013.01); *G06Q 10/0639* (2013.01); *G06Q 10/06395* (2013.01)

(58) Field of Classification Search
CPC ..................................................... G06Q 10/06
See application file for complete search history.

(56) References Cited

U.S. PATENT DOCUMENTS

2002/0133368 A1   9/2002   Strutt et al.
2002/0165757 A1   11/2002   Lisser
(Continued)

FOREIGN PATENT DOCUMENTS

WO   2007065195 A1   6/2007

OTHER PUBLICATIONS

International Search Report Corresponding to PCT/AU2016/050196 dated May 2, 2016.
(Continued)

*Primary Examiner* — Kurtis Gills
(74) *Attorney, Agent, or Firm* — Davis & Bujold PLLC; Michael J. Bujold

(57) ABSTRACT

Systems and methods for monitoring the operation of a business are described, the methods including the steps of: receiving operational data from a plurality of businesses, the operational data being derived from the businesses use of software programs; calculating at least one individual performance indicator based on the operational data for the business; calculating at least one group performance indicator based on the operational data for a plurality of businesses; and comparing the individual performance indicator with the group performance indicator.

5 Claims, 5 Drawing Sheets

(56) References Cited

U.S. PATENT DOCUMENTS

| | | | |
|---|---|---|---|
| 2003/0118978 A1* | 6/2003 | L'Allier | G09B 7/02 |
| | | | 434/362 |
| 2004/0044552 A1 | 3/2004 | Marwood | |
| 2006/0004624 A1 | 1/2006 | Melara et al. | |
| 2008/0059292 A1* | 3/2008 | Myers | G06Q 10/06 |
| | | | 705/7.39 |
| 2008/0168046 A1* | 7/2008 | Oara | G06F 16/284 |
| 2009/0047643 A1* | 2/2009 | Isaac | G09B 19/00 |
| | | | 434/237 |
| 2011/0066472 A1 | 3/2011 | Scheider | |
| 2014/0245254 A1* | 8/2014 | Padmalata | G06Q 10/00 |
| | | | 717/104 |
| 2015/0154526 A1* | 6/2015 | Yates | G06Q 10/06393 |
| | | | 705/7.39 |
| 2016/0034274 A1* | 2/2016 | Diao | G06Q 10/04 |
| | | | 717/103 |

OTHER PUBLICATIONS

Written Opinion Corresponding to PCT/AU2016/050196 dated May 2, 2016.

European Search Report issued in corresponding European Patent Application No. 16788945.0 dated Aug. 17, 2018.

* cited by examiner

METHODS AND SYSTEMS FOR USE IN MONITORING THE OPERATIONS OF A BUSINESS

TECHNICAL FIELD

The present invention relates to methods and systems for use in monitoring the operations of a business.

BACKGROUND TO THE INVENTION

It is known to calculate various performance indicators which can provide operators of a business with feedback and information regarding the performance of a business. Such indicators typically include established financial and non-financial type measures such as debtor days, turnover and debtor and creditor information as well as inventory and customer information. When measured and reviewed over time, these performance indicators can give business operators an idea of whether the operation of their business is changing for the better or for the worse. However, such indicators do not allow business operators to understand how their business compares to other businesses.

A need remains for improved methods and systems for monitoring the operations of businesses.

SUMMARY OF THE INVENTION

In a first aspect the present invention provides a method of monitoring the operation of a business including the steps of: receiving operational data from a number of businesses, the operational data being derived from the businesses use of software programs; calculating at least one individual performance indicator based on the operational data for the business; calculating at least one group performance indicator based on the operational data for a number of businesses; and comparing the individual performance indicator with the group performance indicator.

The software programs may be hosted online.

The step of comparing may include displaying the individual performance indicator along with the group performance indicator.

The individual performance indicator may be displayed along with the group performance indicator in an onscreen widget.

In a second aspect the present invention provides a system for monitoring the operation of a business including: receiving means for receiving operational data from a number of businesses, the operational data being derived from the businesses use of software programs; calculating means for calculating at least one individual performance indicator based on the operational data for the business and for calculating at least one group performance indicator based on the operational data for a number of businesses; and comparing means for comparing the individual performance indicator with the group performance indicator.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENT

Figure 1:
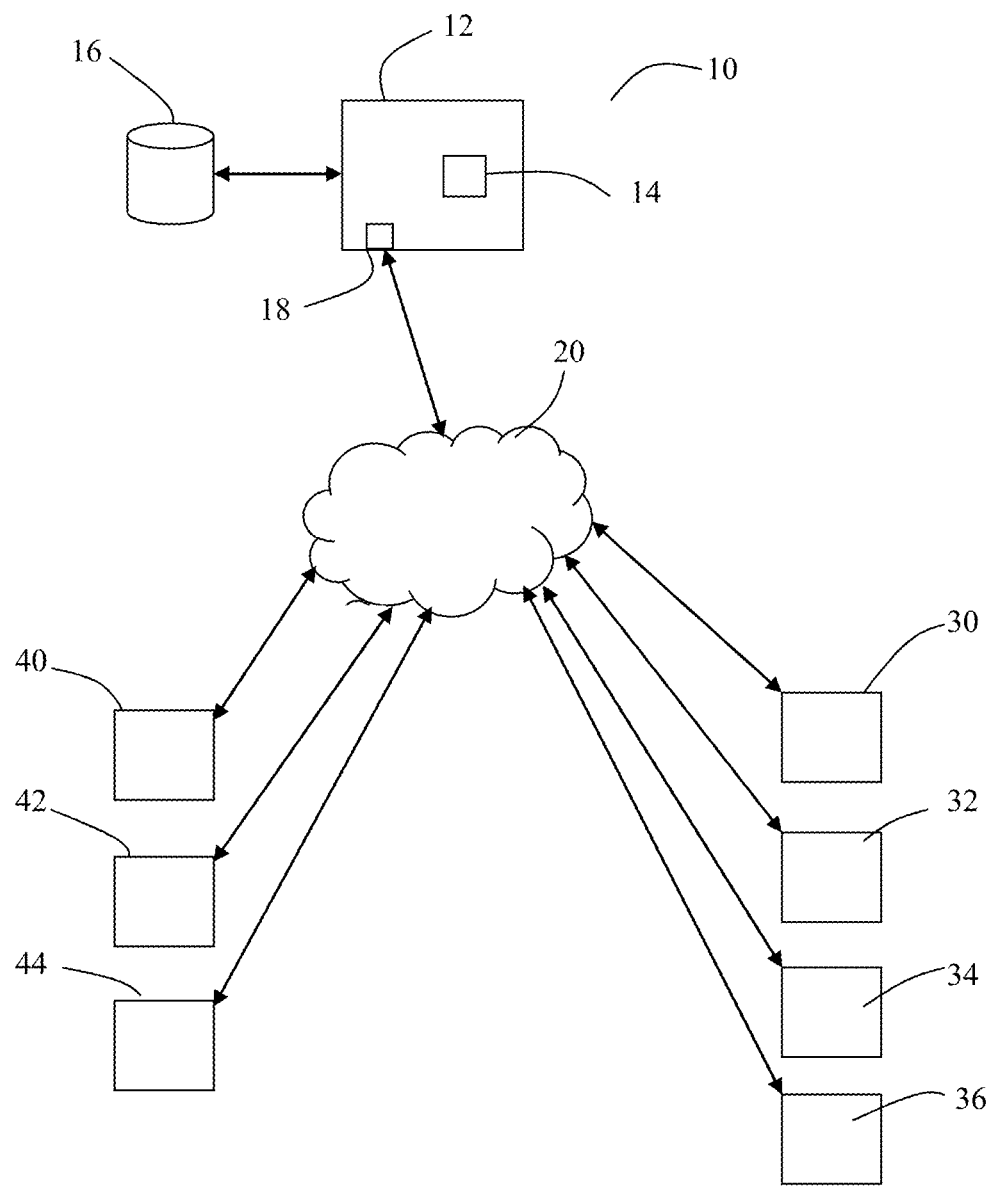
FIG. 1 is a schematic view of a system according to an embodiment of the invention.

Referring to FIG. 1, a system 10 is shown for making online software from vendors 30, 32, 34, 36 available to businesses 40, 42, 44. The system 10 is embodied in an internet connected server computer 12 running suitably configured software under control of an operating system by way of a typical processor and memory architecture 14. Server 12 is connected to database 16 used for storing and retrieving information used in operating the system. Server 12 communicates via the internet 20 by way of router 18 to receive and transmit information used in the system as will be later described. The entire system other than online software from vendors as described is hosted in the cloud, in a secure, high availability, mirrored hosting environment, providing compliance to geographical data sovereignty regulations. Server 12, which in practice may be a collection of more than one physical or virtual servers, communicates information between its databases its applications and Online Software Vendors databases via an API.

System 10 is designed to help SME businesses 40, 42, 44 run their businesses better. System 10 makes available online software "apps" categorised into disciplines (e.g. accounting, inventory, sales people etc.). Each business 40, 42, 44 chooses particular apps from each category that best suits their business. As the business use the apps to run their business they are presented with an automated dashboard which provides key metrics in real-time to the appropriate personnel in the business for management and operations as will now be described.

Figure 2:
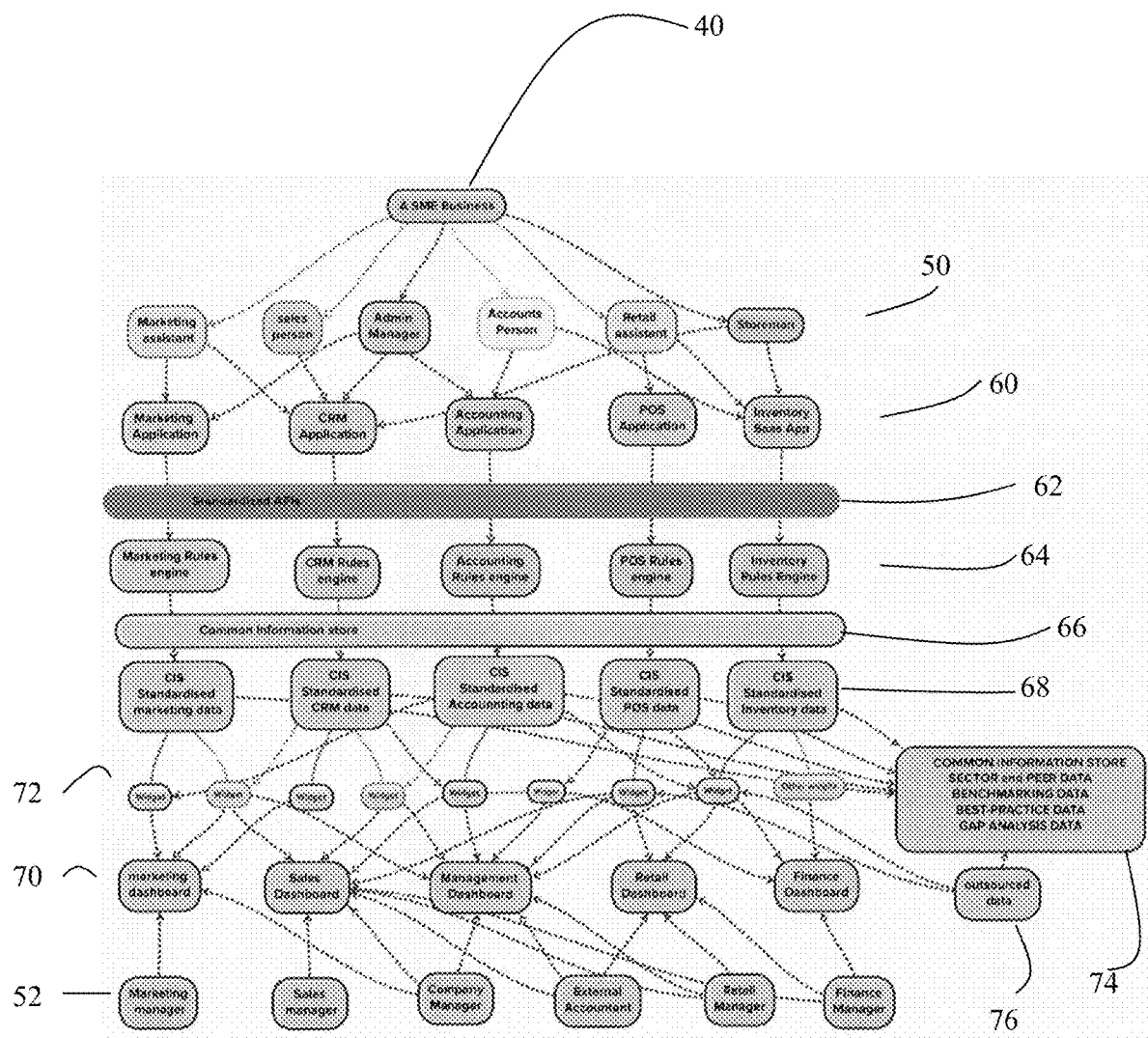
FIGS. 2 and 3 are schematic views illustrating the interworking of various modules of the system of FIG. 10.

Referring to FIG. 2, the operations of business 40 as are illustrated. Business 40 has previously selected various online software apps 60 such as marketing application, CRM application etc. These are used day to day for entering data by business personnel 50 including marketing assistants, sales persons etc.

A standardised API 62 extracts data from apps 60 which is processed by various rules engines 64 to standardise and normalise the data from various app sources. This ensures that data is correctly aligned for use in various widgets and dashboards.

Two rules engine Applications are used to process data.
1. Normalising Rules engine Application,
2. Standardising Rules engine Application These are designed to format data into the correct status for storage in database 16, which is the source of data for the widgets. This method enables processing of large scale volumes of data in real time on the fly.

The Normalising Rules Engines "normalises" each data set in relationship to each vendor source via algorithms ensuring the calculations are like for like. This is performed by obtaining the vendor's data set via an API, performing some calculations and then uniquely labelling it.

For example, income maybe defined by one vendor as AccountID=4 and 5 and defined as AccountType=Revenue in another. This is then normalised to one single value named "sales" within a data set stored in database 16.

The Standising Rules Engine then take the stored data sets and standardises data to ensure data sets are comparative between like businesses eg in common industry sectors, or in revenue bands eg: a business turning over $2 mill has a relationship to a business turning over $1 mill.

The standardisation process involves calculating a baseline average value within an industry and/or segmented via revenue bands, from the normalized data set. This allows an individual to compare their performance to that of their peers.

The normalised and standardised data 68 is stored in a common information store 66 and is used to calculate individual business performance indicators in real-time. Widgets 72 present the performance indicators for decision support and management monitoring. Widgets 72 are arranged in management dashboards 70 which group together widgets of primary interest to managers 52 having particular roles in the business.

When data is extracted from a number of businesses 40, 42, 44, this can be utilised to calculate group performance indicators as will be further described with reference to FIG. 3.

Figure 3:
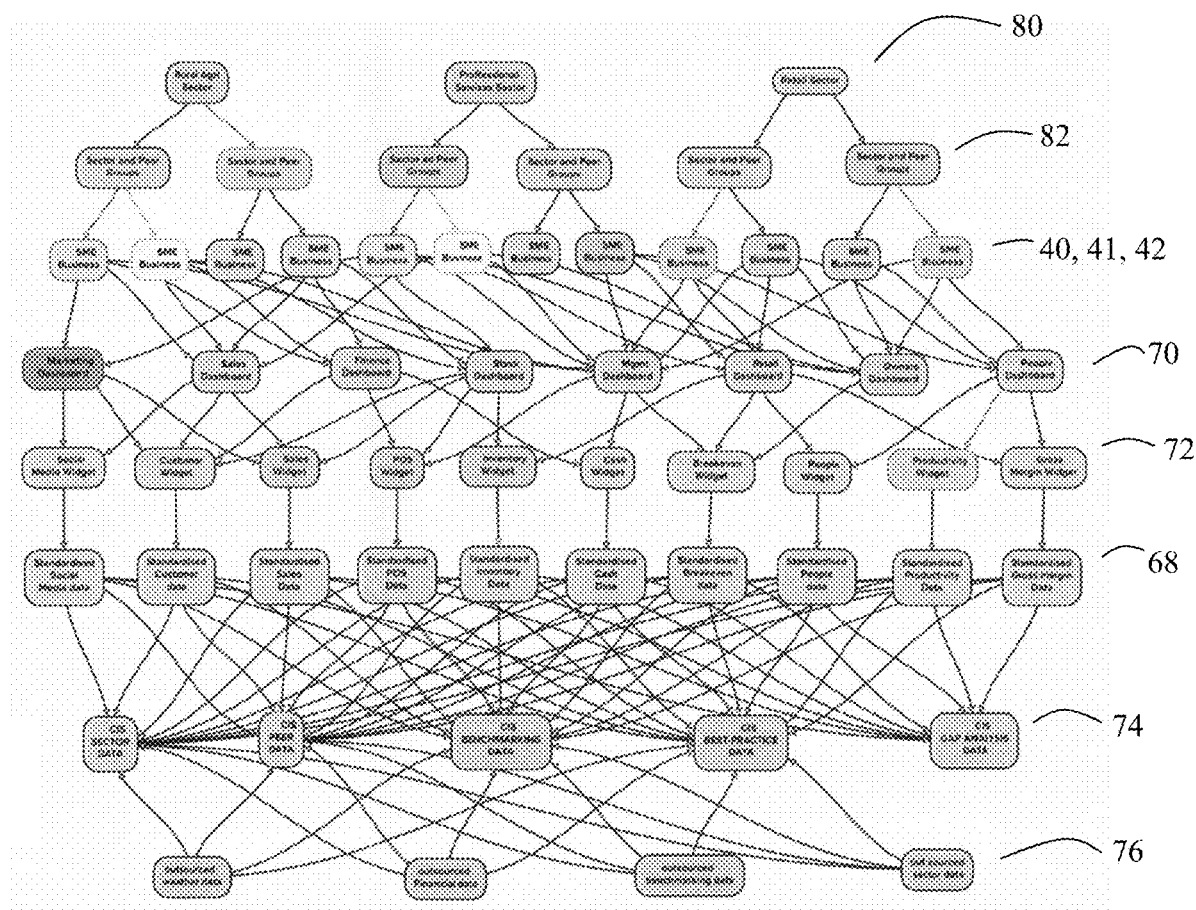

Referring to FIG. 3, when many businesses, 40, 42, 44 are using system 10 then it becomes possible to calculate group performance indicators based on the data obtained for a number of businesses. The businesses 40, 42, 44 are categorised according to their sector 80 and further by peer groups 82 which can be based on a range of factors including size, geographic function or the role of a business within their sector. The common information store 68 collates data from businesses 40, 42, 44 by sector and peer. This data is processed to calculate group performance indicators 74 for benchmarking, best-practice and gap analysis reporting. This enables data from a business in a sector and their peers to be standardised and compared to their own individual business metric.

Outsourced data 76 may additionally be used to calculate either individual or group performance indicators.

Figure 4:
FIG. 4 shows a user interface dashboard presented by the system of FIG. 1.

Referring to FIG. 4, an example of a dashboard 70 is shown including six widgets including cash position and solvency widget 72a, debtor & creditor balance widget 72b, customer engagement widget 72c, business growth widget 72d, bookings and staff widget 72e and gross profit widget 72f.

Figure 5:
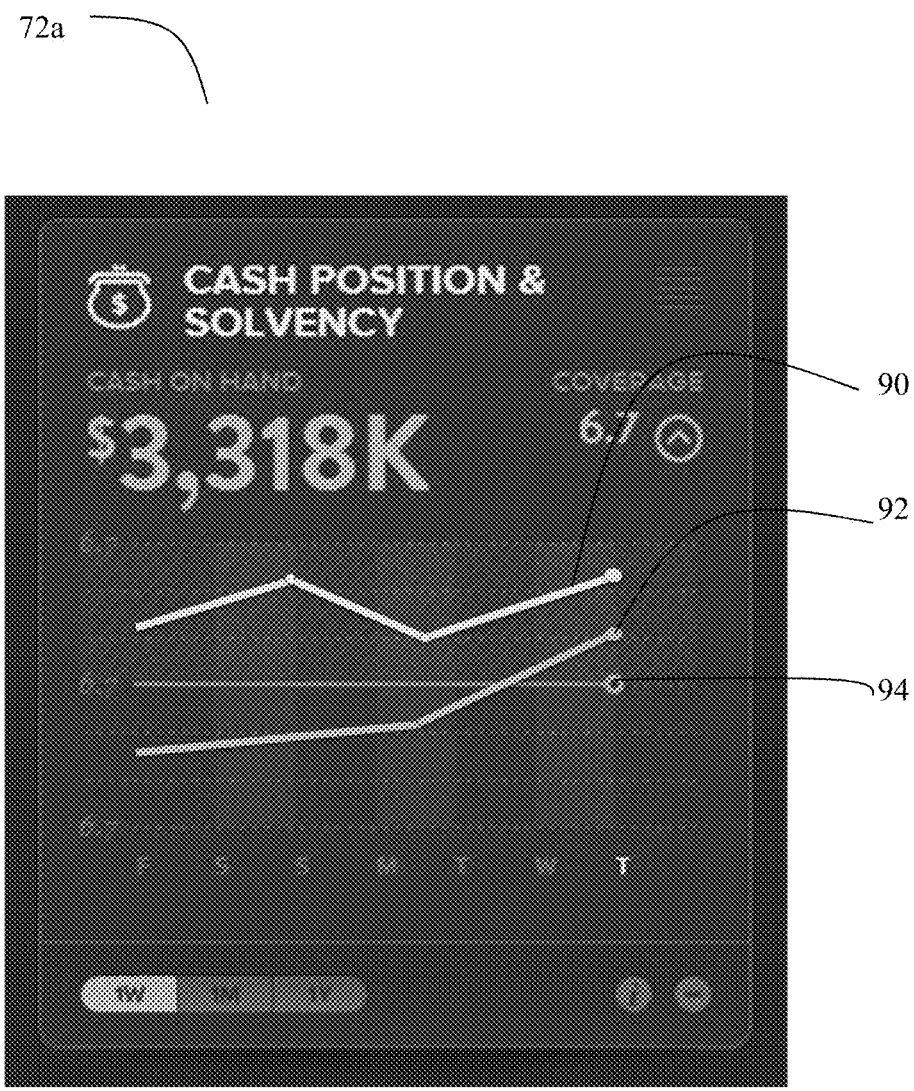
FIG. 5 shows one of the widgets of the dashboard of FIG. 4.

Referring to FIG. 5, widget 72a is shown in isolation. It includes graph lines showing the cash position in terms of "coverage". This is calculated by dividing the debtor balance by the creditor balance shown in widget 72b of FIG. 4. Line 94 depicts the individual performance indicator of the business that is viewing the widget. The other lines are group performance indicators and include a benchmark indicator line 92 and a best practice indicator line 90. A gap analysis is the difference between lines 94 and 90.

The widgets allow the data stored in the common information store 74 to be sliced and diced and optionally combined, overlaid or enhanced with outsourced data 76 in a practically unlimited number of combinations.

Similarly, the group performance indicators can be calculated based on classes of business grouped by various factors or combinations of factors such as industry sector, geographic location, size etc.

It is preferred that the widgets are not configurable by users to improve the ease of use of the software for the end user.

One example of use of outsourced data is weather data. It has been found that the performance of a certain types of businesses varies with the weather. For instance, shops located inside shopping malls tend to perform better when it is raining. Shops located outside tend to perform better when the weather is fine. The projected performance of a business can be estimated taking into account weather forecast data.

It can be seen that embodiments of the invention have at least one of the following advantages:

Business managers can monitor and compare the performance of their business in relation to other businesses.

The classes of other businesses against which the performance of an individual business is compared can be changed to provide various business insights Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A method of monitoring operation of a plurality of businesses, via internet, comprising a server computer comprising a processor, running software under control of an operating system, and a data base connected to the server computer, the method comprising:

making available a plurality of on-line software programs, from a plurality of vendors, to the plurality of businesses to be monitored via the server computer connected to the internet;

permitting the businesses to access, via the server computer and the internet, and select software programs, from the available plurality of software programs of the server computer, for day to day use by the respective business;

monitoring each one of the plurality of businesses in real-time to determine operational data;

receiving the operational data, via the internet, in the database of the server computer, from each one of the plurality of businesses, and the operational data being derived from the day to day use of each software program selected by each of the plurality of businesses;

calculating, via a system of monitoring operation of the business, at least one individual performance indicator of each respective business based on the operational data for the respective business;

calculating, via the system of monitoring operation of each respective business, at least one group performance indicator based on the operational data for the plurality of businesses;

comparing, via the system of monitoring operation of each respective business, the individual performance indicator of each respective business with the group performance indicator of the plurality of businesses in real-time based on the operational data received in real-time;

providing, to each respective business being monitored by the system, an automated dashboard interface that displays at least one business insight relating to the individual performance indicator of the respective business relative to the group performance indicator so that each business operator of each respective business being monitored understand how the business of the business operator compares with other businesses being monitored, the at least one business insight providing key metrics in real-time to each business operator; and displaying the individual performance indicator along with the group performance indicator in an onscreen widget in real-time in the automated dashboard interface for each respective business being monitored by the system.

2. The method according to claim 1, further comprising hosting the software programs online.

3. The method according to claim 1, further comprising formatting data received by each software application into a correct format for the database, wherein data is provided to the onscreen widget from the database.

4. The method according to claim 1, further comprising:
providing multiple onscreen widgets to the dashboard; and
grouping together the widgets of primary interest based on the operational data in the database;
wherein the widgets are not configurable by the user.

5. A system of monitoring operation of a plurality of businesses, via internet, the system comprising a server computer having a processor, running software under control of an operating system, and coupled to a data base, and the plurality businesses being connected to the server computer, via the internet, to facilitate the monitoring operation, the system further comprising:
the system storing a plurality of on-line software programs from a plurality of vendors for access, via the server computer connected to the internet, by the plurality of businesses to be monitored;
each of the plurality of businesses, when connected to the server computer via the internet, being permitted by the system to access and select software programs, from the available plurality of software programs of the server computer, for day to day use by the respective business;
following use of one or more selected software programs by the plurality of businesses, the system monitoring each one of the plurality of businesses in real-time to receiving receive operational data, via the internet, from each of the plurality of businesses and stores the operational data in the database of the server computer, and the operational data being derived from the day to day use of each software program selected by each of the plurality of businesses;
the system calculating at least one individual performance indicator of each respective business based on the operational data received from the respective business;
the system also calculating at least one group performance indicator based on the operational data for the plurality of businesses;
the system then comparing the individual performance indicator of each respective business with the group performance indicator of the plurality of businesses in real-time based on the operational data received in real-time;
the system providing via an automated dashboard interface, to each respective business being monitored by the system, at least one business insight relating to the individual performance indicator of the respective business relative to the group performance indicator so that each business operator of each respective business being monitored understand how the business of the business operator compares with other businesses being monitored by the system, the at least one business insight providing key metrics in real-time to each business operator; and
the system displaying the individual performance indicator along with the group performance indicator in an onscreen widget in real-time in the automated dashboard interface for each respective business being monitored by the system.

* * * * *